(12) United States Patent
Loheide et al.

(10) Patent No.: US 7,694,945 B2
(45) Date of Patent: Apr. 13, 2010

(54) HYDRAULICALLY DAMPING ELASTOMER BEARING

(75) Inventors: Stefan Loheide, Wallenhorst (DE); Hubert Siemer, Dinklage (DE); Burkhard Meyer, Dinklage (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 379 days.

(21) Appl. No.: 11/683,135

(22) Filed: Mar. 7, 2007

(65) Prior Publication Data
US 2007/0216074 A1  Sep. 20, 2007

(30) Foreign Application Priority Data
Mar. 20, 2006  (DE)  ........................ 10 2006 013 084

(51) Int. Cl.
*F16F 5/00* (2006.01)
(52) U.S. Cl. .................................................. 267/140.14
(58) Field of Classification Search ............ 267/140.12, 267/140.14, 104.15; 248/638; 251/129.17
See application file for complete search history.

(56) References Cited

U.S. PATENT DOCUMENTS

| | | | | |
|---|---|---|---|---|
| 4,858,899 A | * | 8/1989 | Saotome et al. ............. | 267/219 |
| 5,076,550 A | * | 12/1991 | Mayama et al. ........ | 267/140.12 |
| 5,139,241 A | * | 8/1992 | Hamaekers et al. .... | 267/140.12 |
| 2005/0275145 A1 | * | 12/2005 | Muraoka et al. ........ | 267/140.14 |

FOREIGN PATENT DOCUMENTS

| | | |
|---|---|---|
| DE | 101 04 458 A1 | 9/2002 |
| DE | 103 59 343 A1 | 7/2005 |
| JP | 60220239 | 11/1985 |
| JP | 1135939 | 5/1989 |
| JP | 2002061702 | 2/2002 |

* cited by examiner

*Primary Examiner*—Robert A Siconolfi
*Assistant Examiner*—Anna Momper
(74) *Attorney, Agent, or Firm*—McGlew and Tuttle, P.C.

(57) ABSTRACT

A hydraulically damping elastomer bearing has at least one housing (1, 2), a connection element (3), an elastomer body (4), which couples the housing (1, 2) and the connection element (3) with one another in a vibration-damping manner. Two chambers (5, 6) filled with a fluid are provided as well as at least one flow channel (8), which connects the chambers (5, 6) to one another. A recess (9) in the housing (1, 2) is associated with the flow channel (8). A valve (10) is present in the recess (9) for opening and closing the flow channel (8). An actuator (11) is provided for actuating the valve (10) on the outside of the housing (1, 2). The valve (10) includes an elastic diaphragm (12), in which an insert (13) is embedded.

18 Claims, 4 Drawing Sheets

HYDRAULICALLY DAMPING ELASTOMER BEARING

CROSS REFERENCE TO RELATED APPLICATIONS

This application claims the benefit of priority under 35 U.S.C. §119 of German Patent Application DE 102006 013 084.7 filed Mar. 20, 2006, the entire contents of which are incorporated herein by reference.

FIELD OF THE INVENTION

The present invention pertains to a hydraulically damping elastomer bearing with a housing, a connection element, an elastomer body, which couples the housing and the connection element with one another in a vibration-damping manner, two chambers filled with a fluid and a flow channel, which connects the chambers to one another.

BACKGROUND OF THE INVENTION

The significance of the damping of vibrations generated in a motor vehicle and of external vibrations that are transmitted, for example, from the pavement to the vehicle, increases with increasing demands on comfort. This is of significance especially because of the necessary reduction of the noise level in the interior space and the reduction of vibrations that are perceived as being unpleasant.

Elastomer bearings are increasingly used, for example, to mount the drive assembly or movable components in the motor vehicle because of the favorable springing and damping properties of elastomer materials. The quality and the damping properties are substantially affected by the specific composition of the elastomer. The hardness and the elasticity of the bearings can be decisively affected by changing the material composition of the elastomer. However, a limit is set to this variability where great vibration amplitudes must be damped. These are generated, for example, when the drive assembly is idle or when motions act on the chassis periodically and in a shock-like manner on an uneven pavement. These so-called resonant vibrations can only be damped with conventional elastomer bearings or rubber bearings to a limited extent. However, since precisely resonant vibrations are felt to be very disturbing and very unpleasant in the vehicle, and moreover, these vibrations may bring about damage to expensive components, hydraulically damping elastomer bearings are increasingly used in modern motor vehicles.

These have at least two chambers, which are separated from one another, and in which a damping fluid is contained. The chambers are connected to one another via a flow channel and are deformed in case of an external force acting on the elastomer bearing, so that damping fluid can pass over from one chamber into the other. The chamber walls offer a resistance to the change in shape, which leads to a change in the pressure in the chambers. An indicator of this change in pressure due to the change in volume thus generated is called the "buckling spring rate." To compensate the pressure difference between the chambers, the chambers are connected to one another via the flow channel already mentioned. Pressure equalization takes place between the chambers exclusively via this flow channel in case of spring compression with low frequencies. It follows from this that the elastomer bearing in this case makes a decisive contribution to the springing and damping of the elastomer bearing.

However, a damped system, which is capable of vibrating, and which comprises the elastic chambers walls and the mass of the damping fluid contained in the flow channel, is of increasing significance as the frequency increases.

If an elastomer bearing with hydraulic damping is excited in the range of a resonant frequency, the damping changes and the elastic properties of the elastomer bearing as a whole will change as well. Finally, the inertia of the amount of fluid present in the flow channel and the friction prevent a further pressure equalization between the chambers above the resonant frequency. As a result, the rigidity of the chamber walls supports the rigidity of the carrier and brings about an increase in the overall rigidity compared to the low-frequency type of load.

A hydraulically damping elastomer bearing, which is designed as an aggregate bearing for mounting the drive assembly of a motor vehicle according to the disclosure content of the document, is known from DE 101 04 458 A1. This has a housing as well as a connection element. The housing and the connection element are coupled with one another via an elastomer bearing in a vibration-damping manner. The housing and the connection element can thus be fastened at different components of the motor vehicle and consequently moved relative to one another. Furthermore, the hydraulically damping elastomer bearing known from DE 101 04 458 A1 has two chambers, which are filled with a fluid and which are connected to one another by a flow channel. This connection is designed as an open damping channel and makes possible the amortization of vibrations of the vehicle acting on the elastomer bearing, which amortization was already mentioned in the introduction. Furthermore, the prior-art elastomer bearing with hydraulic damping has an additional flow channel. This flow channel is designed as a bypass channel to the damping channel and is closed during the normal operation of the elastomer bearing. The bypass channel is opened only when needed, so that additional frequency ranges can hereby be damped, which would otherwise be passed on directly into the passenger compartment or to the motor vehicle. A valve, which acts on the bypass channel from the outside through a recess present in the housing and thus opens and closes same, is used to close the bypass channel. An actuator, which is in turn used to actuate the valve, is likewise located on the outside of the housing.

Also known are solutions in which the actuator is arranged directly within the elastomer bearing. JP 2002061702 A or JP 01135939 A are mentioned here as examples only. However, this is disadvantageous for several reasons. Thus, the properties of the damping fluid can be affected by the actuator, which is designed as an electromagnet in the prior-art solutions. In addition, such an elastomer bearing can be manufactured in a comparatively complicated manner, and the control lines for the actuator must be led off to the outside, which entails considerable sealing problems.

Compared to the embodiments with an actuator accommodated in the damping fluid, a hydraulically damping elastomer bearing, as is known from DE 101 04 458 A1, has the decisive advantage that neither the damping fluid within the bearing nor the actuator arranged therein is subject to mutual wear. The actuator arranged outside the elastomer bearing can be easily replaced when needed. No supply lines need to be led out of the elastomer bearing, and the elastomer bearing can be mounted in a simple manner. The actuator is an electromagnet, whose armature is formed by the valve. The valve itself reaches directly into the flow channel of the elastomer bearing via a piston made of an elastomer plastic. Thus, problems arise concerning the compliance with necessary tolerances during the manufacture of such an elastomer bearing, which makes mounting, on the whole, complicated and leads to an increase in the cost of the elastomer bearing in question. Another problem can be seen in the fact that the elastomer plug used in the prior-art solution is inserted into the flow channel designed as a bypass channel on the front side of the valve at right angles to the direction of flow and is thus exposed to high pressures at the vibration frequencies acting on the elastomer bearing. Consequently, this elastomer plug must have high stability, because its elasticity could lead to an impairment of the hydraulic bearing effect in case of a closed flow channel. Moreover, the sealing of the recess in the housing to avoid the escape of damping fluid from the elastomer bearing is relatively complicated.

Furthermore, a valve in the form of a diaphragm, which consists, on the whole, of an elastomer material, is known from JP 60-220239 A. Based on frequent switching operations during the opening and closing of the flow channel, this diaphragm is subject to extreme wear, so that the service life of an elastomer bearing of such a design is limited. Moreover, the closing force, which is necessary for closing the existing bypass channel, and which must be generated by the valve, is considerable, because the valve must be moved against the direction of flow of the fluid passing through the bypass channel in order to make it possible to close the bypass channel.

SUMMARY OF THE INVENTION

The basic object of the present invention is to provide a hydraulically damping elastomer bearing, which permits fatigue-free and low-noise, reliable closure of the flow channel. The elastomer bearing shall, moreover, be able to be mounted in a simple manner and the manufacturing costs shall be low.

According to the invention, a hydraulically damping elastomer bearing is provided with a housing, a connection element and an elastomer body, which couples the housing and the connection element with one another in a vibration-damping manner. The bearing has two chambers filled with a fluid, at least one flow channel, which connects the chambers to one another, a recess in the housing, which recess is associated with the flow channel, a valve present in the recess for opening and closing the flow channel, and an actuator fastened to the outside of the housing for actuating the valve. The valve is manufactured according to the present invention from an elastic diaphragm, in which an insert is embedded.

The insert present within the diaphragm makes it possible, according to the solution being presented here, to attach an actuator directly in this area. Thus, the valve has locally the strength necessary for the switching operation involved in opening and closing the flow channel. The valve is otherwise designed as an easily movable, elastic diaphragm with a relatively high intrinsic elasticity. As a consequence of the fact that the valve is designed as a diaphragm, it can be moved easily, so that comparatively weak forces need to be generated by the actuator for the necessary switching operation. The elastomer bearing according to the present invention thus switches with easy motion, very securely and reliably and, moreover, with low noise. Wear of the moving components of the valve can be nearly ruled out. It was thus also possible to considerably improve the service life of an elastomer bearing according to the present invention due to the novel features. On the whole, a very simple and consequently inexpensive embodiment variant of an elastomer bearing with hydraulic damping is obtained. Due to the integration of a plurality of functions in the diaphragm, it was possible to reduce the number of necessary components. The sealing of the elastomer bearing towards the outside is substantially improved compared to prior-art designs. Secure and reliable closability of the flow channel is now guaranteed as well. The elastomer bearing according to the present invention as a whole can be manufactured in a modular design, because the elastomer bearing and the actuator can be manufactured separately and need to be fitted together only at the time of installation in the motor vehicle or during the manufacture of an assembly unit. Furthermore, considerable advantages arise concerning a possible tolerance compensation between the components that are to be connected to one another.

According to one embodiment of the present invention, the insert may be designed as a plate, which makes possible the advantage of simple manufacture and uncomplicated connection to the diaphragm accommodating the insert.

A more special design can be seen in the fact that the plate is designed as a pin plate with at least one pin. This at least one pin makes possible the optimal action of the actuator, so that the positioning of the actuator relative to the valves is simplified and, moreover, the mode of action thereof during the closing or opening of the flow channel is optimized.

As was already mentioned in the introduction, considerable difficulties arise in embodiments known hitherto concerning the sealing of the flow channel, because there is a risk that damping fluid will escape at the point of the elastomer bearing at which the recess intended for the valve is present in the housing. This happens especially in extreme load situations and in case of a high pressure that thus builds up within the bearing or the chambers. It is proposed for this reason that the insert be connected in substance to the diaphragm.

A connection in substance is defined especially as a bonding or a vulcanization process, which makes the insert with the diaphragm into a one-part component, which is connected in substance and which can be manufactured in a simple manner.

The problem with the sealing of the hydraulically damping elastomer bearing according to the present invention towards the outside, which was already described, can be improved corresponding to a variant of the present invention by connecting the elastic diaphragm forming the valve in substance with the housing. It is assumed in case of this connection in substance, which is being mentioned here, that the diaphragm is bonded, for example, into the recess of the housing or is connected to the housing by means of a vulcanization process. Reliable sealing of the elastomer bearing is thus guaranteed.

Besides the connection of the valve in substance with the housing, it is, moreover, advantageous to connect the valve to the housing in a non-positive manner. For example, a clamping connection can be considered to be a non-positive connection. This can be achieved when the housing is of a multipart design, i.e., for example, when it comprises an outer part and an inner part and the edge of the diaphragm is held clamped between this inner part and the outer part. Such an embodiment facilitates the manufacturability of the elastomer bearing according to the present invention, because the energy-intensive vulcanization process can be avoided. Optimal sealing of the elastomer bearing can be guaranteed with the clamping connection being presented.

Since the valve is preferably inserted from the outside of the housing into the recess that is provided in the housing for this purpose and it correspondingly acts on the flow channel from the outside in order to close or open same, it is arranged at right angles to the direction of flow relative to the direction of flow within the flow channel. This means that flow-related transverse forces act on the valve from one side or the other during the closing or opening operation or as long as the valve closes the flow channel. For the reasons stated, another embodiment of the present invention can be considered in the fact that the diaphragm forming the valve preferably has a contour that is complementary to the geometry of the flow channel, which geometry is closed by the valve. Due to such a complementary contour, the valve is enabled to reach into the flow channel or into a part thereof, so that reliable and secure sealing of the flow channel can be guaranteed. However, this embodiment variant shall not be defined as being limited. Complementary contours include any and all contours that engage one another correspondingly and thus assume a sealing function.

To guide the valve and to compensate the forces acting on the valve due to the flow, it is, furthermore, proposed that a positioning stud, which is associated with the valve, corresponds to same and meshes with a recess present at the valve in the closed state of the valve, be present on the surface of the flow channel located opposite the valve. The positioning stud and the recess thus form the aforementioned complementary contour. The positioning stud can thus also be used for the transverse stabilization of the valve if the flow arrives at the valve in the flow channel laterally, i.e., the valve must be moved at right angles to the direction of flow of the fluid.

Various mechanisms are conceivable as actuators for an elastomer bearing with hydraulic damping according to the solution being presented here. Thus, the actuator may be an electromagnet or a hydraulically, pneumatically, mechanically, electrically, or electric motor-operated actuator. The energy used to move the valve can be selected on the basis of the conditions given in the motor vehicle. No limits are set to the use of different actuators here because of the very simple design of the valve according to the present invention, because only the insert as a working area for the actuator at the valve needs to be adapted in order to use, for example, a hydraulic actuator instead of an electric motor.

However, the actuator is an electric motor and the insert is correspondingly a metallic insert in a preferred embodiment. The insert of the valve should be metallic because this insert is assumed to possess ferromagnetic properties in order to guarantee optimal cooperation with an actuator designed as an electromagnet.

To optimize the working surface, i.e., the contact surface between the actuator and the insert of the valve, it is, furthermore, proposed that the insert have a contact plate with ferromagnetic properties, whose front side facing away from the flow channel has a flat surface. This flat surface has the decisive advantage that regardless of the component tolerances, which may possibly be present, the actuator can be brought into contact with the housing of the elastomer bearing with an acceptable dispersion in relation to the valve and the mode of action of the valve for closing and opening the flow channel is nevertheless possible without limitations.

Corresponding to another embodiment of the present invention, the contact plate may be connected to the insert in a non-positive manner (e.g., a friction or clamped connection) or with a connection in substance (a material connection such as vulcanization, a weld, bond or solder) or designed as a one-part component with the insert, i.e., depending on the requirements imposed or the local conditions, a separate contact plate, which is connected to the insert, may be used, or the insert may be used itself as a contact plate. The insert is consequently ferromagnetic as a whole in the case mentioned last. If a separate contact plate is used, which is connected to the insert, it would be possible to manufacture the insert from a different material and to make only the contact plate ferromagnetic, so that it can cooperate with the electromagnet in the above-described manner.

The electromagnet may be a lifting magnet and preferably equipped with an armature, which has a permanent magnet on the side facing the insert for fixation at the contact plate or at the insert. Thus, there is a permanent connection between the front side of the armature of the electromagnet and the insert or the contact plate at the insert. No disturbing clattering noises are generated during the switching operation because the connection between the component exists.

As is known in solutions according to the state of the art, it is also possible and, depending on the particular application, also meaningful in the embodiment according to the present invention to provide a plurality of flow channels within the elastomer bearing with hydraulic damping. Thus, the flow channel can be designed as a bypass channel to another, non-closed damping channel connecting the chambers in a flow-carrying manner.

Further, highly advantageous embodiments of the present invention can be seen in the fact that, for example, the above-mentioned damping channel can have a smaller cross section and has a greater length than the flow channel.

The elastomer bearing with hydraulic damping according to the present invention may be used just as well as an aggregate bearing to mount the drive assembly of a motor vehicle as a so-called "bush bearing." The bush bearings are used, for example, to mount chassis control arms or subframes in order to damp the vibrations introduced into the wheel of the motor vehicle by the pavement. Further fields of application are, of course, also conceivable for the present invention, but they cannot be listed here completely.

Connection components are provided, as a rule, to connect the hydraulically damping elastomer bearing according to the present invention to the motor vehicle. However, it is also possible that the elastomer bearing with its housing is inserted directly into a corresponding mounting opening of a motor vehicle component. The housing can be inserted partially or as a whole into the corresponding mounting opening.

The present invention will be explained in more detail below on the basis of the drawings attached. However, the exemplary embodiment being shown does not represent any limitation of the variant being shown, but is used only to explain a principle of the present invention. Identical components or components of the same kind are designated by the same reference numbers. To illustrate the mode of operation according to the present invention, the figures show, furthermore, only greatly simplified schematic views, in which components not essential to the present invention are not shown. However, this does not mean that such components are not present in a solution according to the present invention. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENT

Figure 1:
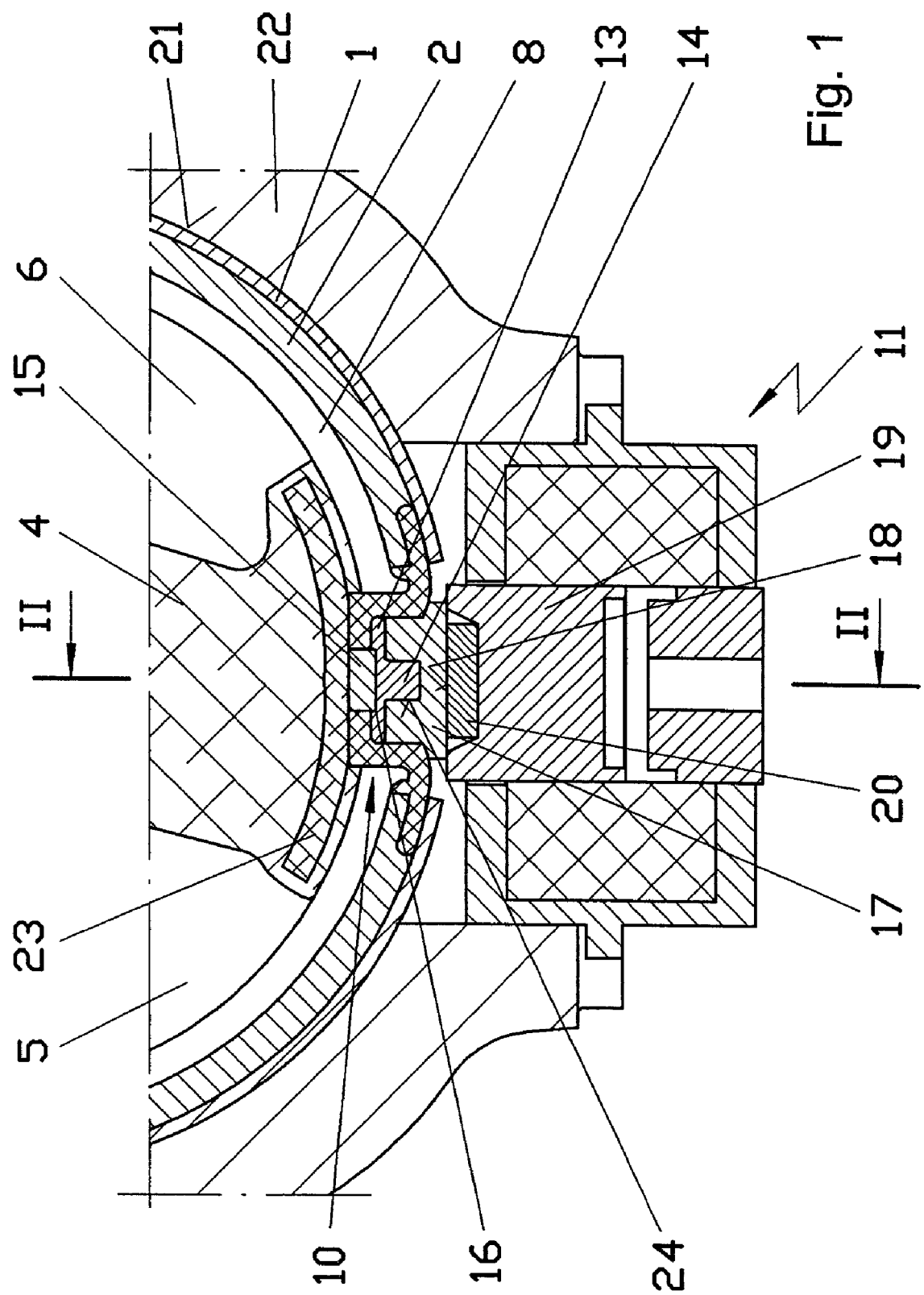
FIG. 1 is a partial sectional view through an elastomer bearing according to the present invention.
Figure 2:
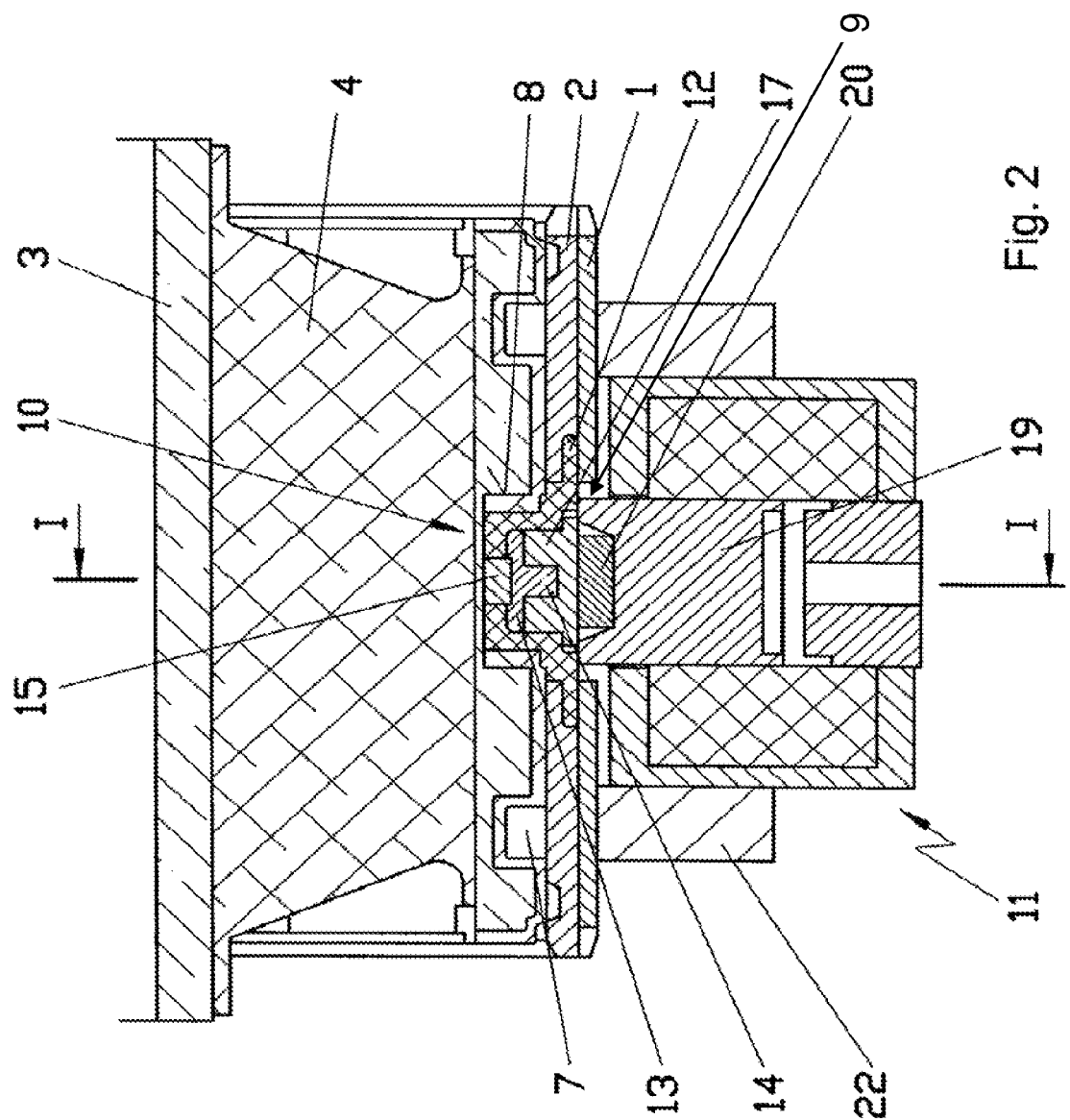
FIG. 2 is a detail of section II-II from FIG. 1.

Referring to the drawings in particular, the view of a detail of section I-I according to FIG. 2, which is shown in FIG. 1 and is not true to scale, shows the essential elements of a hydraulically damping elastomer bearing according to the present invention. This has a two-part housing 1, 2, which comprises an outer part 1 and an inner part 2. The housing is designed in this case as a bushing, which is hollow on the inside, and has an approximately regular cylindrical contour. A connection element 3 for connecting the elastomer bearing to another motor vehicle component, which connection element is not recognizable in FIG. 1, is located in the inner cavity of the housing 1, 2. The connection element 3 is recognizable more clearly in FIG. 2. An elastomer body 4, which connects the housing 1, 2 and the connection element 3 and is manufactured in one vulcanization process together with these components, is arranged between the housing 1, 2 and the connection element 3. To achieve the hydraulic damping action of the bearing, two chambers 5, 6, which are located opposite each other and are connected to one another by a damping channel 7 in the example, are provided within the elastomer bearing being shown here. The damping channel 7 is designed as a continuously open channel, so that the flow-carrying connection 7.1 between the chambers 5, 6 is permanently present. Besides the elastomer body 4, damping action of the elastomer bearing according to the present invention is thus also achieved via the oscillatory fluid column within the damping channel 7.

Another flow channel 8, which can be called a bypass channel, is present in the bearing independently from the damping channel 7 and likewise connects the chambers 5 and 6 to one another, can be considered to be a peculiar feature in this case. The housing 1, 2 has a recess 9, which is closed by a valve 10. The valve 10 comprises a diaphragm 12 and an insert, which is arranged therein and is designated by 13 as a whole. An actuator 11, which is an electromagnet in this case, is used to actuate the valve 10. The exemplary embodiment of an elastomer bearing with hydraulic damping, which is shown in FIG. 1, has, moreover, a contact plate 17 at the insert 13 designed as a pin plate. To improve the connection between the contact plate 17 and the insert 13, a pin 14 is arranged at the insert 13 approximately centrally. This pin 14 meshes with a recess 24, which is present at the contact plate 17 and is complementary to the pin 14. The insert 13, which is designed as the pin plate 14, as well as the contact plate 17 are rigidly connected to one another in the embodiment being shown. The rigid connection of the contact plate 17 and the pin plate 14 may be either a bonded connection or a press fit. On the side of the insert 13 located opposite the pin 14, the insert 13 has a recess 16, which is meshed or engaged with a positioning stud 15 present at the reinforcing insert 23 or at the elastomer body 4. This is also a positive-locking connection, which is, however, detachable. The positioning stud 15 is made in one piece with the reinforcing insert 23 of the elastomer body 4 in this case. The contact plate 17 has a flat surface 18 on its side located opposite its recess 24 and facing the electromagnet 11. A permanent magnet 20 is recessed in the armature 19 of the electromagnet 11, approximately centrally. This permanent magnet 20 is located opposite the flat surface 18 of the contact plate 17. Since the contact plate 17 consists of a ferromagnetic, i.e., magnetizable material, a detachable, but stable connection is established here between the armature 19 of the electromagnet 11 and the contact plate 17. The valve 10 is movable in the radial direction in relation to the elastomer bearing being shown because of the elastic diaphragm 12. The valve 10 can thus close the flow channel 8 or open it when needed. The normal state of the valve 10 is a closed state, so that the flow channel 8 is opened only when, for example, the rigidity of the elastomer bearing is to be reduced and damping can be largely omitted to improve comfort.

The hydraulically damping elastomer bearing shown in FIG. 1 is inserted as a whole with the outer part 1 of the housing into a mounting opening 21 of a motor vehicle component 22. The electromagnet 11, which acts as an actuator for the valve 10, is arranged on the outside at the elastomer bearing. It is in turn inserted into an opening present in the motor vehicle component 22. The modular design of the elastomer bearing with hydraulic damping according to the present invention permits the subsequent installation as well as replacement of the electromagnet 11, which may possibly become necessary. Thus, it is also possible to add the electromagnet 11 later, only after the insertion of the elastomer bearing into the mounting opening 21 of the motor vehicle component. The flat surface 18 of the contact 17 in this case has a supporting action in order to compensate existing tolerances between the components to be connected to one another, because no exactly defined point of attachment of the electromagnet 11 is provided for on the surface 18 of the contact plate 17. Since the geometric dimensions of the surface 18 are larger than the permanent magnet 20 present at the armature 19 of the electromagnet 11, there always is a reliable connection between these components. The functionality of the elastomer bearing is thus always guaranteed according to the invention being presented here.

Section II-II in FIG. 1 is shown in FIG. 2 and shall be explained briefly below. This view shows the connection element 3 shown in a partial section. The elastomer body 4 is arranged between the connection element 3 and the housing 1, 2, which comprises the outer sleeve 1 and the inner part 2. The components are inseparably connected to one another by a vulcanization process. The damping channel 7, which connects the chambers 5 and 6 to one another in a flow-carrying manner, is located in the reinforcing insert 23 provided within the elastomer body 4. FIG. 2 also shows the flow channel 8 from another perspective. It is closed by the valve 10, which comprises the diaphragm 12, the insert 13 and the contact plate 17. The diaphragm 12 is held between the housing parts outer sleeve 1 and inner part 2 by a clamping connection.

Figure 3:
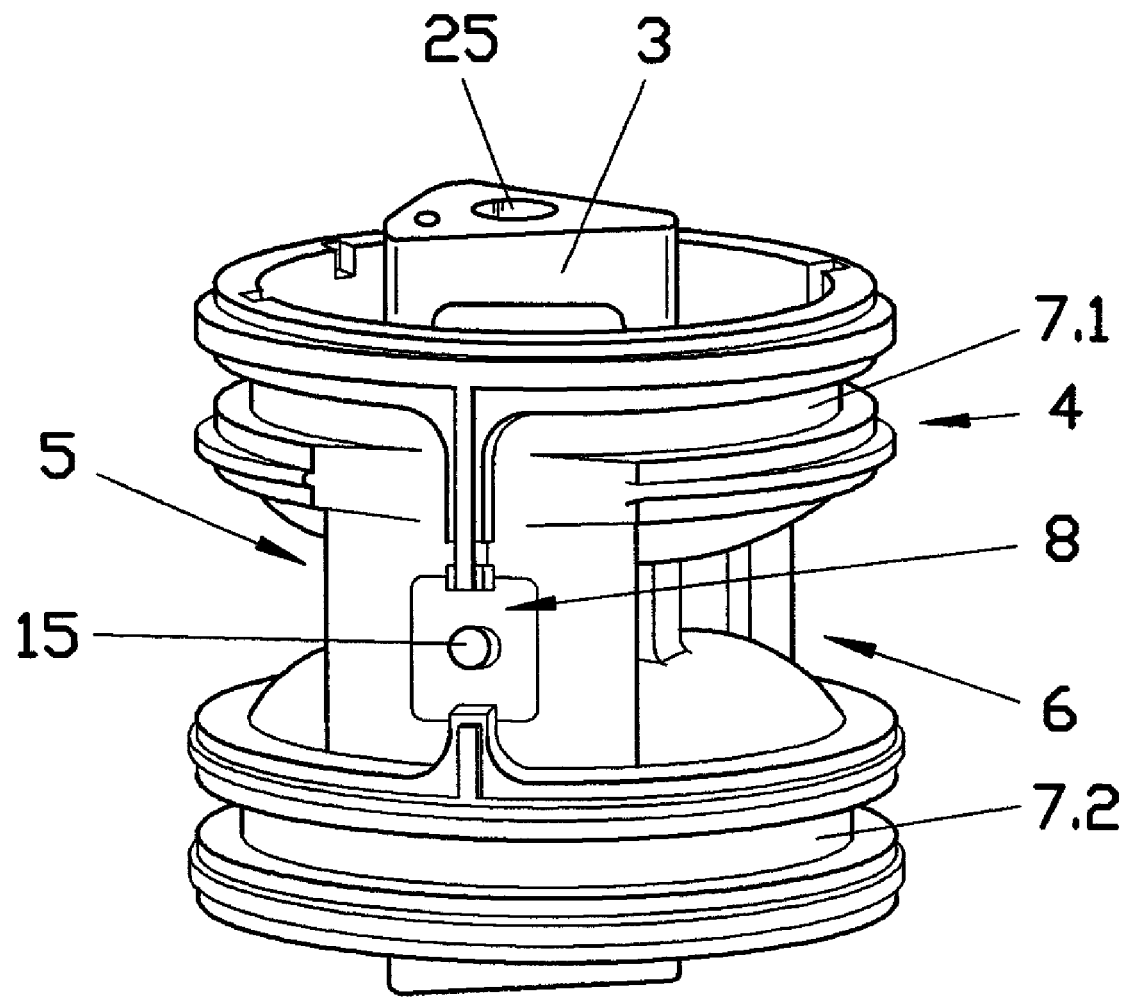
FIG. 3 is a perspective view of the elastomer bearing as well as of the connection element of a hydraulically damping elastomer bearing with the housing, valve and actuator removed.

FIG. 3 shows the inner part of the elastomer bearing in a perspective view. The housing 1, 2 with the valve 12 has been omitted in this view. The connection element 3, which is surrounded by the elastomer body 4, thus becomes recognizable. There is a through connection hole 25 within the connection element 3. This hole may be used to receive a screw bolt in order to fasten the elastomer bearing to a motor vehicle component. The chambers 5 and 6 are recessed in the elastomer body 4. These are connected to one another in a flow-carrying manner via the damping channel 7, which comprises two partial channels 7.1 and 7.2 here, so that in the case that the load on the elastomer bearing in a radial direction leads to a reduction of the volume of a first chamber (7.1 or 7.2) and the fluid contained therein is sent into the opposite chamber via the damping channel 7, 7.1, 7.2, as one partial channels 7.1 communicates with chambers 5, 6 at one side, as seen in FIG. 3, whereas the other partial channels 7.2 communicates with the chambers 6, 7 at the opposite side from what is shown in FIG. 3. A web 30, which extends in the axial direction and is interrupted by an opening approximately centrally, is very clearly recognizable from the view in FIG. 3. This opening forms the flow channel 8. A positioning stud 15 for positioning the insert 13, which is, however, not shown in the view in FIG. 3, is located in the center of the flow channel 8. The inner part of the elastomer bearing shown is pressed as a whole into the inner part 2 of the housing, i.e., into the housing 1, 2. The mounting takes place in the manner known per se in a liquid bath, so that the chambers 5 and 6 are filled with the damping agent during this connection of the components.

Figure 4:
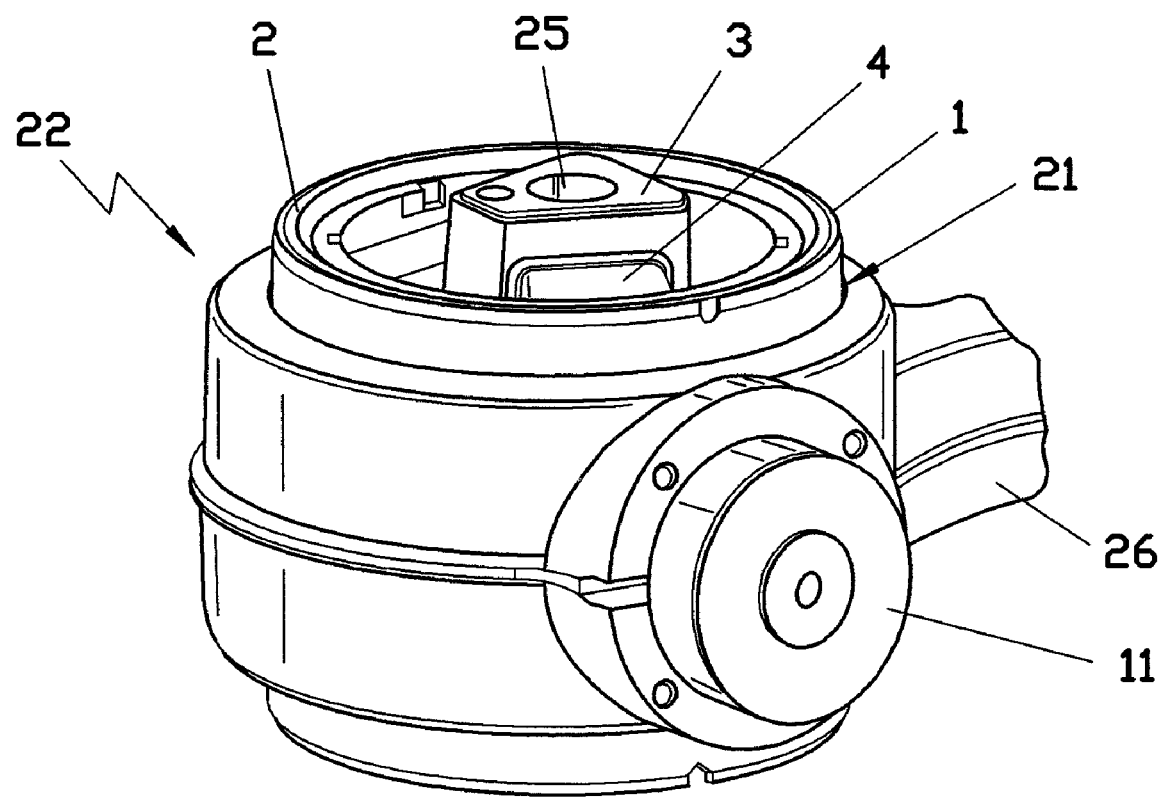
FIG. 4 is a perspective view of a hydraulically damping elastomer bearing inserted into a motor vehicle component.

FIG. 4 shows an installation situation of the hydraulically damping elastomer bearing described in greater detail before. The connection between the elastomer bearing and the motor vehicle component 22 can be illustrated on the basis of the example of a motor vehicle component 22, which shows a part of the housing in FIG. 4. The elastomer bearing is pressed into a mounting opening 21 of the motor vehicle component 22 with its housing 1, 2, the elastomer body 4 located therein and the connection element 3 arranged centrally with the connection hole 25. After the elastomer bearing has been connected to the motor vehicle component 22, the mounting of the electromagnet 11, which actuates as an actuator the valve 10, is carried out from the outside of the motor vehicle component 22. Furthermore, a part of a shaft 26, which is used to connect the motor vehicle component 22 to other connection parts within the motor vehicle, is shown only by way of suggestion at the housing of the motor vehicle component 22.

While a specific embodiment of the invention has been shown and described in detail to illustrate the application of the principles of the invention, it will be understood that the invention may be embodied otherwise without departing from such principles.

APPENDIX

List of Reference Numbers

APPENDIX

| List of Reference Numbers | |
|---|---|
| 1 | Housing (outer part) |
| 2 | Housing (inner part) |
| 3 | Connection element |
| 4 | Elastomer body |
| 5 | Chamber |
| 6 | Chamber |
| 7, 7.1, 7.2 | Damping channel |
| 8 | Flow channel |
| 9 | Recess |
| 10 | Valve |
| 11 | Actuator |
| 12 | Diaphragm |
| 13 | Insert |
| 14 | Pin |
| 15 | Positioning stud |
| 16 | Recess |
| 17 | Contact plate |
| 18 | Flat surface of contact plate |
| 19 | Armature |
| 20 | Permanent magnets |
| 21 | Mounting opening |
| 22 | Motor vehicle component |
| 23 | Reinforcing insert |
| 24 | Recess in contact plate |
| 25 | Connection hole |
| 26 | Shaft |

What is claimed is:

1. A hydraulically damping elastomer bearing comprising:
a housing;
a connection element;
an elastomer body connecting said housing and said connection element with one another in a vibration-damping manner;
two chambers filled with a fluid;
a flow channel connecting said two chambers to one another;
a recess in said housing, said recess being associated with said flow channel;
a valve arranged in said recess for opening and closing said flow channel, said valve comprising an elastic diaphragm with an embedded insert, wherein said insert comprises a pin plate comprising a plate with a pin;
an actuator attached to an outside of said housing for actuating said valve between a closed state and an open state, wherein at least a portion of said elastic diaphragm is arranged in said flow channel when said valve is in a closed state such that said portion of said elastic diaphragm blocks a flow of fluid in said flow channel, said portion of said elastic diaphragm being perpendicular to said flow of fluid when said valve is in said closed state; and
a contact plate having a pin receiving recess on one side thereof, said pin receiving recess receiving said pin, said contact plate having a flat surface on another side thereof, wherein said actuator is an electromagnet and said insert is a metallic insert, said electromagnet comprising a magnet, said magnet engaging said flat surface of said contact plate.

2. A hydraulically damping elastomer bearing in accordance claim 1, wherein said insert is connected to said diaphragm by a connection in substance.

3. A hydraulically damping elastomer bearing in accordance with claim 2, wherein said insert and said diaphragm are bonded or connected to one another by a vulcanization process.

4. A hydraulically damping elastomer bearing in accordance claim 1, wherein said elastic diaphragm forming said valve is connected to said housing by a material connection, said elastic diaphragm sealing said recess.

5. A hydraulically damping elastomer bearing in accordance with claim 4, wherein said diaphragm is bonded into said recess or is connected to said housing by a vulcanization process.

6. A hydraulically damping elastomer bearing in accordance with claim 1, wherein said elastic diaphragm forming said valve is connected to said housing in a non-positive manner.

7. A hydraulically damping elastomer bearing in accordance with claim 6, wherein said housing comprises an outer part and an inner part and an edge of said diaphragm is held clamped between said inner part and said outer part.

8. A hydraulically damping elastomer bearing in accordance claim 1, wherein said diaphragm forming said valve has a contour that is complementary to a geometry of said flow channel, said geometry being closed by said valve.

9. A hydraulically damping elastomer bearing in accordance claim 1, further comprising:
a reinforcing insert comprising a positioning stud associated with said valve and present on a surface of said flow channel, which said surface is located opposite said valve; and
a recess present at said valve, said recess present at said valve receiving at least a portion of positioning stud in said closed state of said valve, said positioning stud engaging said insert in said closed state of said valve, said portion of said elastic diaphragm engaging said reinforcing insert in said closed state of said valve, said elastic diaphragm sealing said recess.

10. A hydraulically damping elastomer bearing in accordance claim 1, wherein said actuator is an electromagnet or a hydraulically, pneumatically, mechanically, electrically or electric motor-operated actuator.

11. A hydraulically damping elastomer bearing in accordance claim 1, further comprising a non-closed damping channel connecting one of said chambers with another of said chambers, wherein said flow channel is designed as a bypass channel to said non-closed damping channel.

12. A hydraulically damping elastomer bearing in accordance with claim 11, wherein said damping channel has a smaller cross section and a longer length than said flow channel.

13. A hydraulically damping elastomer bearing in accordance claim 1, wherein the elastomer bearing forms a bush bearing.

14. A hydraulically damping elastomer bearing in accordance claim 1, further comprising a motor vehicle component wherein said housing is inserted into a corresponding mounting opening of said motor vehicle component.

15. A hydraulically damping elastomer bearing comprising:
   a housing;
   a connection element;
   an elastomer body connecting said housing and said connection element with one another in a vibration-damping manner;
   two chambers filled with a fluid;
   a flow channel connecting said two chambers to one another;
   a recess in said housing, said recess being associated with said flow channel;
   a valve arranged in said recess for opening and closing said flow channel, said valve comprising an elastic diaphragm with an embedded insert, wherein said insert comprises a pin plate comprising a plate with a pin, said insert having a contact plate with ferromagnetic properties, said contact plate having a front side facing away from said flow channel with a flat surface;
   an actuator attached to an outside of said housing for actuating said valve between a closed state and an open state, wherein at least a portion of said elastic diaphragm is arranged in said flow channel when said valve is in a closed state such that said portion of said elastic diaphragm blocks a flow of fluid in said flow channel, said portion of said elastic diaphragm being perpendicular to said flow of fluid when said valve is in said closed state; and
   a contact plate having a pin receiving recess on one side thereof, said pin receiving recess receiving said pin, said contact plate having a flat surface on another side thereof, wherein said actuator is an electromagnet and said insert is a metallic insert, said electromagnet comprising a magnet, said magnet engaging said flat surface of said contact plate.

16. A hydraulically damping elastomer bearing comprising:
   a housing;
   a connection element;
   an elastomer body connecting said housing and said connection element with one another in a vibration-damping manner;
   two chambers filled with a fluid;
   a flow channel connecting said two chambers to one another;
   a recess in said housing, said recess being associated with said flow channel;
   a valve arranged in said recess for opening and closing said flow channel, said valve comprising an elastic diaphragm with an embedded insert, wherein said insert comprises a pin plate comprising a plate with a pin, said insert having a contact plate with ferromagnetic properties, said contact plate having a front side facing away from said flow channel with a flat surface, said contact plate being connected to said insert in a non-positive manner or with a material substance connection or forms a one-part component with said insert;
   an actuator attached to an outside of said housing for actuating said valve between a closed state and an open state, wherein at least a portion of said elastic diaphragm is arranged in said flow channel when said valve is in a closed state such that said portion of said elastic diaphragm blocks a flow of fluid in said flow channel, said portion of said elastic diaphragm being perpendicular to said flow of fluid when said valve is in said closed state; and
   a contact plate having a pin receiving recess on one side thereof, said pin receiving recess receiving said pin, said contact plate having a flat surface on another side thereof, wherein said actuator is an electromagnet and said insert is a metallic insert, said electromagnet comprising a magnet, said magnet engaging said flat surface of said contact plate.

17. A hydraulically damping elastomer bearing comprising:
   a housing;
   a connection element;
   an elastomer body connecting said housing and said connection element with one another in a vibration-damping manner;
   two chambers filled with a fluid;
   a flow channel connecting said two chambers to one another;
   a recess in said housing, said recess being associated with said flow channel;
   a valve arranged in said recess for opening and closing said flow channel, said valve comprising an elastic diaphragm with an embedded insert, wherein said insert comprises a pin plate comprising a plate with a pin;
   an actuator attached to an outside of said housing for actuating said valve between a closed state and an open state, wherein at least a portion of said elastic diaphragm is arranged in said flow channel when said valve is in a closed state such that said portion of said elastic diaphragm blocks a flow of fluid in said flow channel, said portion of said elastic diaphragm being perpendicular to said flow of fluid when said valve is in said closed state; and
   a contact plate having a pin receiving recess on one side thereof, said pin receiving recess receiving said pin, said contact plate having a flat surface on another side thereof, wherein said actuator is an electromagnet and said insert is a metallic insert, said electromagnet comprising a magnet, said magnet engaging said flat surface of said contact plate, said electromagnet being a lifting magnet.

18. A hydraulically damping elastomer bearing comprising:
   a housing;
   a connection element;

an elastomer body connecting said housing and said connection element with one another in a vibration-damping manner;

two chambers filled with a fluid;

a flow channel connecting said two chambers to one another;

a recess in said housing, said recess being associated with said flow channel;

a valve arranged in said recess for opening and closing said flow channel, said valve comprising an elastic diaphragm with an embedded insert, wherein said insert comprises a pin plate comprising a plate with a pin;

an actuator attached to an outside of said housing for actuating said valve between a closed state and an open state, wherein at least a portion of said elastic diaphragm is arranged in said flow channel when said valve is in a closed state such that said portion of said elastic diaphragm blocks a flow of fluid in said flow channel, said portion of said elastic diaphragm being perpendicular to said flow of fluid when said valve is in said closed state; and a contact plate having a pin receiving recess on one side thereof, said pin receiving recess receiving said pin, said contact plate having a flat surface on another side thereof, wherein said actuator is an electromagnet and said insert is a metallic insert, said electromagnet comprising a magnet, said magnet engaging said flat surface of said contact plate, wherein an armature of said electromagnet includes a permanent magnet for fixation at said contact plate or said insert.

* * * * *